Oct. 24, 1967　　　　　G. W. PURDY　　　　　3,348,323
COMBINATION LAND LEVELER
Filed June 17, 1964　　　　　　　　　　　　　　4 Sheets-Sheet 1
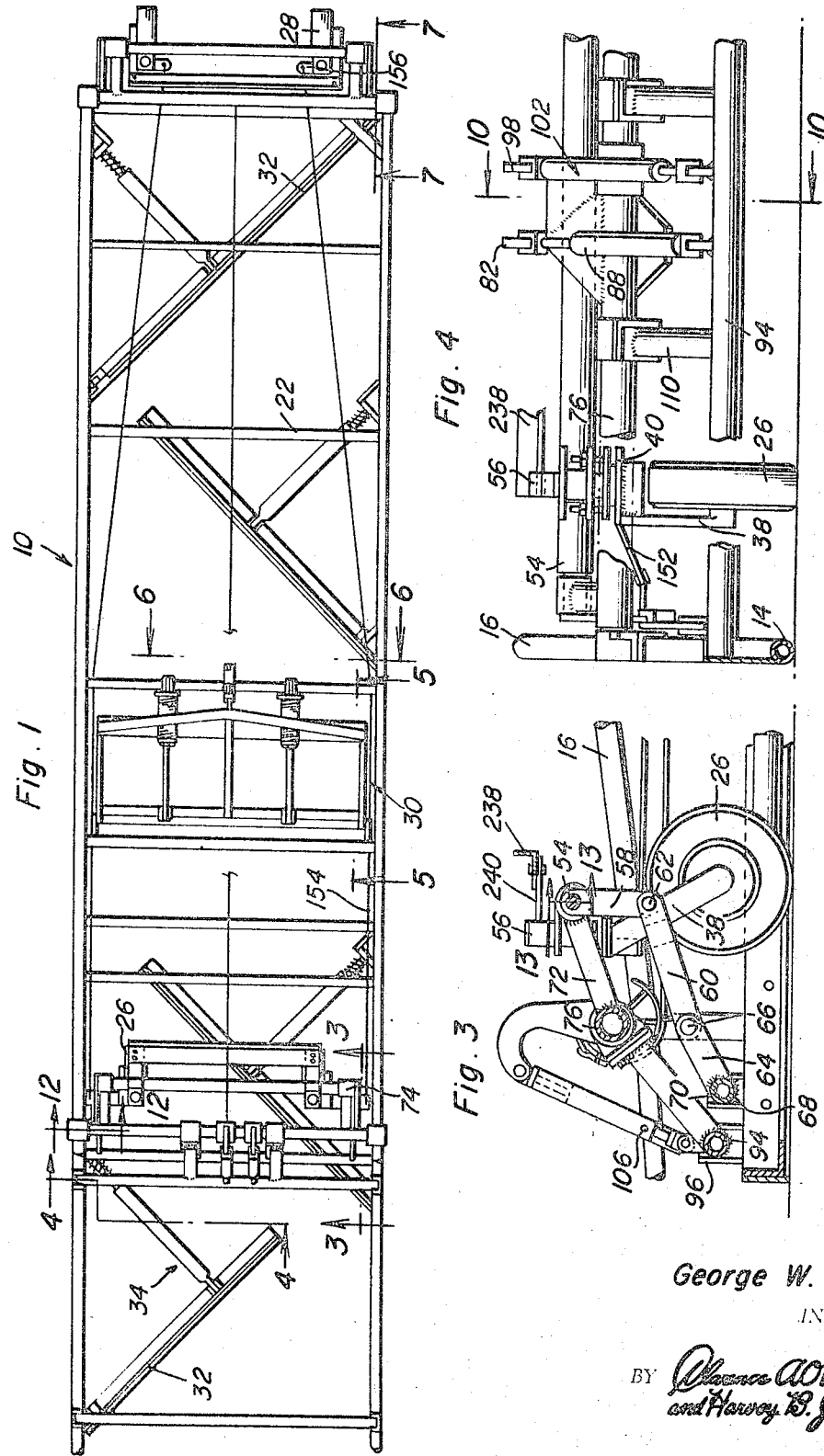
George W. Purdy
INVENTOR.
BY *Thomas A. O'Brien*
*and Harvey B. Jackson*
Attorneys Oct. 24, 1967  G. W. PURDY  3,348,323
COMBINATION LAND LEVELER
Filed June 17, 1964  4 Sheets-Sheet 2
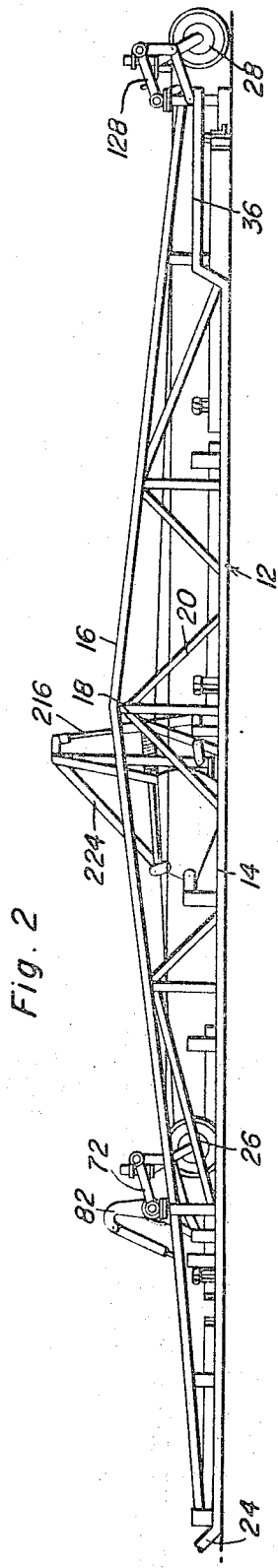
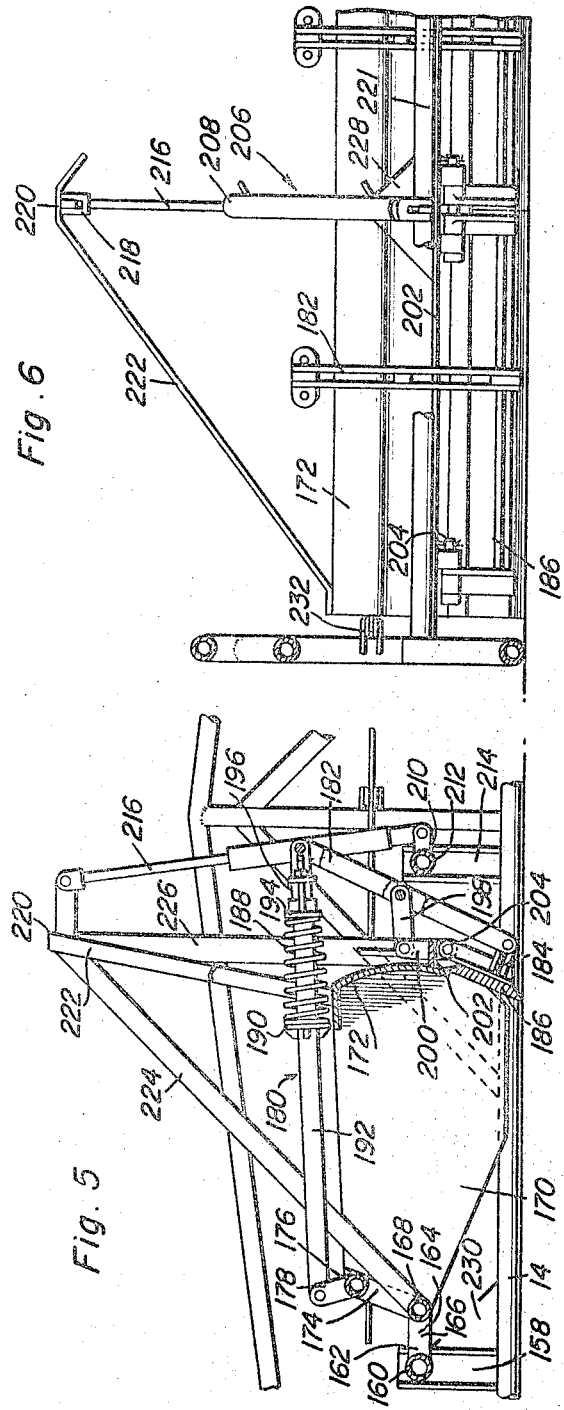
George W. Purdy INVENTOR.
BY *Clarence A. O'Brien*
*and Harvey B. Jacobson*
Attorneys

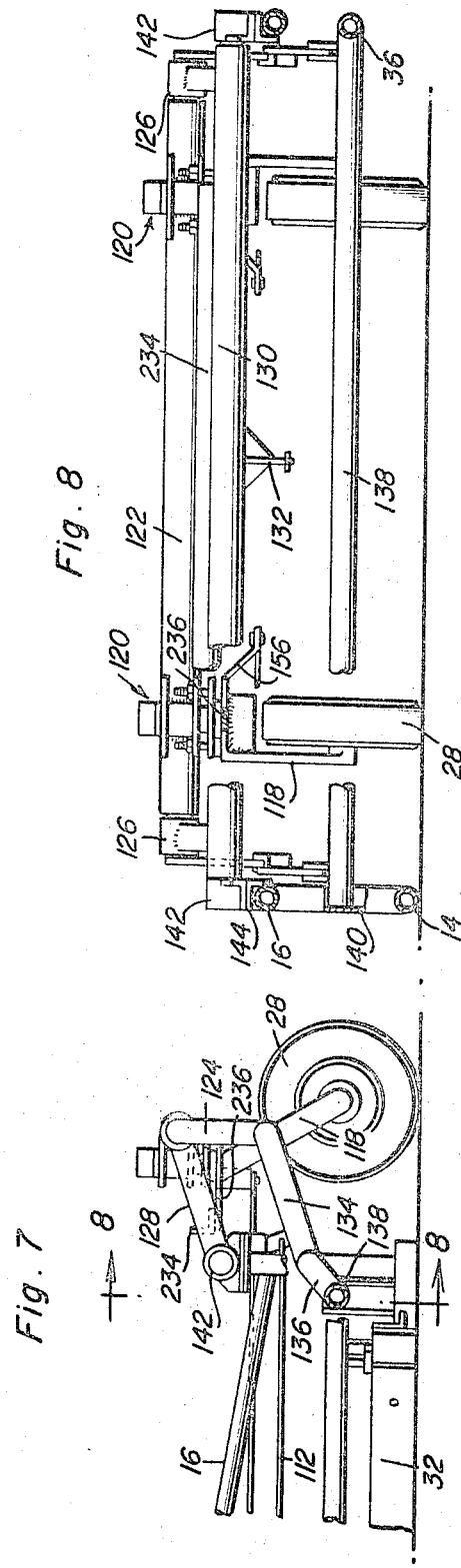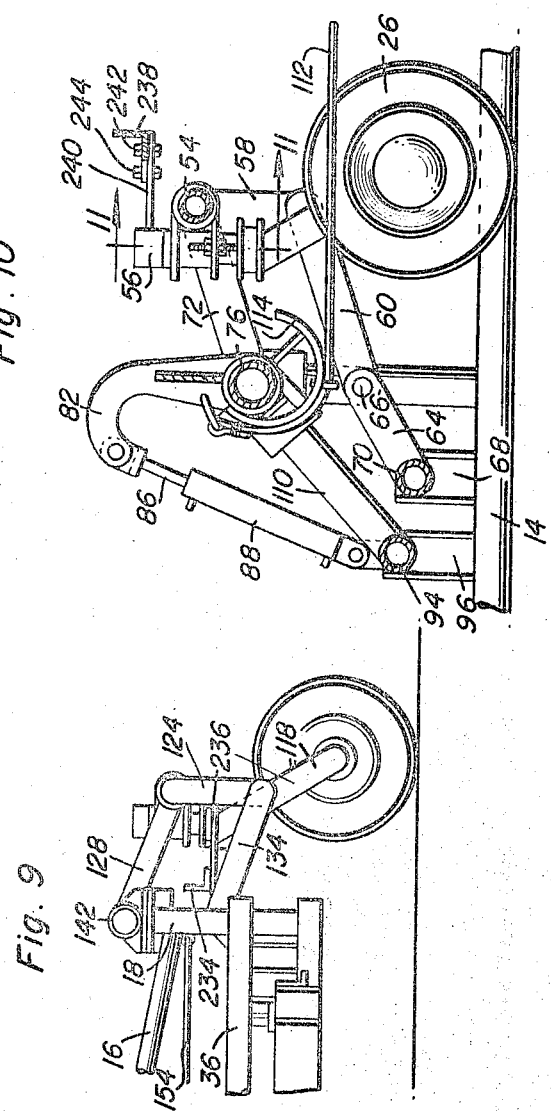

Oct. 24, 1967  G. W. PURDY  3,348,323
COMBINATION LAND LEVELER
Filed June 17, 1964  4 Sheets-Sheet 4

George W. Purdy
INVENTOR.

BY *Clarence A. O'Brien*
*and Harvey B. Jacobson*
Attorneys

United States Patent Office 3,348,323
Patented Oct. 24, 1967

3,348,323
COMBINATION LAND LEVELER
George W. Purdy, 901 S. Jefferson,
De Witt, Ark. 72042
Filed June 17, 1964, Ser. No. 375,738
9 Claims. (Cl. 37—180)

The present invention generally relates to a land leveler and represents certain improvements in the structure shown in prior Patent Nos. 3,047,969, issued Aug. 7, 1962, for Land Leveler and 3,063,178, issued Nov. 13, 1962, for Land Leveler With Trip Blades.

An object of the present invention is to provide a land leveler which is provided with a selectively usable transversely extending bucket-type blade arrangement which may be orientated in an operative lowered position or an inoperative raised position with the lower edge of the bucket having a trip blade assembly associated therewith.

Another object of the present invention is to provide a land leveler having four elevatable support wheels located at the corners of the leveler with the support wheels being steerable with the front and rear wheels being interconnected so that the rear wheels are pivoted in a direction opposite to the pivotal movement of the front wheels thus enabling the leveler to make a substantially square corner in order to enable it to maneuver more easily in a field being leveled.

Still another object of the present invention is to provide a land leveler in accordance with the immediately preceding object in which the swivel axis for each of the support wheels is supported from a parallelogram type of linkage so that the swivel axis thereof is maintained in substantially vertical orientation even if the wheels are lowered or raised in relation to the elongated frame.

Still another object of the present invention is to provide a land leveler which includes hydraulic means for raising and lowering the support wheels in relation to an elongated frame for elevating both ends of the frame simultaneously and including lock means for locking the frame in a desired adjusted position.

Yet another object of the present invention is to provide a combination land leveler having a plurality of angular blades disposed with their lower edge generally in the same horizontal plane as the lower edge of the frame whereby the dirt moved by the blades is moved in a zig-zag pattern during forward movement of the land leveler for effectively leveling the surface of the land.

Yet another important object of the present invention is to provide a combination land leveler with leveling blades and a leveling bucket that is selectively usable which is not intended as a scoop but is used in assisting in leveling land for carrying excess material to low spots where it may be discharged for more effectively leveling the land.

Yet another feature of the present invention is to provide a land leveler which is simple in construction, easy to operate and control, efficient in operation and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the land leveler of the present invention with parts thereof broken away;

FIGURE 2 is a side elevational view of the construction of FIGURE 1;

FIGURE 3 is a detailed sectional view taken substantially upon a plane passing along section line 3—3 of FIGURE 1 illustrating the front support wheels and the supporting mechanism therefor;

FIGURE 4 is a transverse, sectional view taken substantially upon a plane passing along section line 4—4 of FIGURE 1 illustrating further structural details of the front wheel supporting mechanism;

FIGURE 5 is a detailed sectional view taken substantially upon a plane passing along section line 5—5 of FIGURE 1 illustrating the specific construction of the bucket structure and the mechanism for enabling the trip blades thereon to operate and the mechanism for raising and lowering the bucket;

FIGURE 6 is a transverse, sectional view taken substantially upon a plane passing along section line 6—6 of FIGURE 1 illustrating further structural details of the bucket mechanism;

FIGURE 7 is a detailed sectional view taken substantially upon a plane passing along section line 7—7 of FIGURE 1 illustrating the supporting mechanism for the rear wheels;

FIGURE 8 is a transverse, sectional view taken substantially upon a plane passing along section line 8—8 of FIGURE 7 illustrating further structural details of the rear wheel supporting assembly;

FIGURE 9 is a detailed sectional view similar to FIGURE 7 but with the rear wheels in their lower position for elevating the frame;

FIGURE 10 is a sectional view similar to FIGURE 3 and taken along section line 10—10 of FIGURE 4 illustrating further structural details of the front wheel supporting mechanism;

Figure 11:
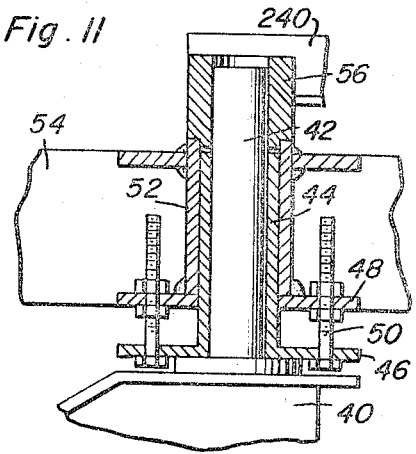
FIGURE 11 is a detailed sectional view taken substantially upon a plane passing along section line 11—11 of FIGURE 10 illustrating the swivel structure for the steerable wheels.

Referring now specifically to the drawings, the numeral 10 generally designates the combination land leveler of the present invention which includes an elongated rigid framework generally designated by the numeral 12 including lower side rails 14 and an upper side rail 16 that has the end points thereof adjacent the lower side rails 14 with the intermediate points being connected thereto by a plurality of vertical side members 18 rigidified by braces 20 all serving to form a longitudinally elongated rigid framework interconnected by a plurality of transverse rails 22. All of the rails may conveniently be constructed of conventional pipe having joints that are welded together so that the entire unit forms a rigid framework from front to rear and from side to side.

Extending from the front of the frame 12 is a suitable hitch assembly in the form of a forwardly extending tongue pivotally attached to upturned ears 24 at the forward ends of the lower rails 14.

For supporting the frame 12, there is provided a pair of front supporting wheels 26 and a pair of rear supporting wheels 28 each of which has a supporting mechanism to be described in detail hereinafter. Centrally of the frame 12 is a selectively operable bucket assembly 30 and located forwardly and rearwardly of the bucket assembly 30 is a plurality of angulated blades 32 such as the trip blades shown in prior Patent No. 3,063,178 in which the pivotal section of the trip blade is retained in place by a spring biased telescopic plunger means or assembly 34. The arrangement of the blades may vary as long as the blades extend forwardly of the front support wheels 26 and as long as the rearmost blade 32 extends to one edge of the frame where there is an upwardly offset portion 36 of one of the side rails 14. Thus, as the soil passes under the land leveler, the blades 32 will cause the soil to move in a zig-zag path for leveling the land.

The support mechanism for the front wheels 26 includes a supporting yoke 38 in the form of a forwardly inclined member journalling a wheel 26 at the bottom thereof and having a horizontally disposed upper end portion 40 provided with an upwardly extending spindle 42 rigid therewith and normally disposed in a vertical position. The spindle 42 is received within a sleeve 44 having a flange 46 at the bottom thereof which is secured to a flange 48 by a bolt assembly 50 which secures the sleeve bushing 44 to a rigid supporting sleeve 52 and a transversely extending support member 54.

The spindle 42 is provided with a retaining cap 56 on the upper end thereof which has a reduced shoulder received within the stationary sleeve 52 for retaining the spindle 42 assembled in the sleeve bushing 44. Thus, the sleeve bushing 44 may be easily removed and replaced as required when worn thus facilitating the repair of the spindle for enabling swivelling movement of the front supporting wheel 26 about substantially a vertical axis.

The ends of the support member 54 have a depending arm 58 rigid therewith which is pivotally attached to a link 60 by a pivot pin or bolt 62. The end of the link 60 is pivotally attached to a stationary arm 64 by a pivot pin or bolt 66 and the arm 64 is stationarily welded to an upstanding bracket 68 carried by the side rails with the inner ends of the stationary arms 64 being axially connected to a transverse brace member 70 as illustrated in FIGURE 1 thus forming a rigid pair of arms 64 for retaining the pivot point 56 stationary in relation to the frame.

Paralleling the link 60 is a link 72 having a sleeve on the rear end thereof as at 74 which is journalled on the transverse member 54 and the forward end of the arm 72 is rigidly affixed to a transverse support member 76 journaled in sleeve bearings 78 supported by bracket 80 carried by the upper side rails 16 so that as the forward transverse support member 76 is rotated, the arms 72 will be swung in a vertical plane thus swinging the transverse support member 54 in a vertical plane. However, in view of the rigid nature of arm 58 with the support member 54 and the link 60 being connected at point 62 to the arm 58 and at point 66 to the stationary arm 64, a parallelogram type of linkage is provided for supporting the front wheels 26 so that the spindle 42 will be retained in substantially a vertical position during raising and lowering of the support wheels 26 in relation to the frame 12.

For changing the elevation of the wheels 26, there is provided a hook-shaped arm 82 on the transverse support member 76. The free end of the hook-shaped arm 82 is connected pivotally to a yoke 84 on the end of a piston rod 86 which is telescopic in relation to a cylinder 88 having the lower end thereof pivotally attached to a bracket 90 by a pivot pin 92 with the bracket 90 being rigidly affixed to a transverse support member 94 that is rigidly affixed to upstanding brackets 96 carried by the side rails 14. Thus, by expansion and contraction of the piston and cylinder assembly 88, the support member 76 may be pivoted about its longitudinal axis. For locking the support member 76 in adjusted position, a second hook-shaped arm 98 is provided with one end thereof being pivotally attached to a yoke 100 on a telescopic assembly 102 having the lower end pivotally attached to a bracket 104 on the transverse support member 94. The telescopic assembly 102 is secured in adjusted position by a removable lock pin 106 which will retain the front supporting wheels 26 in an adjusted position without retaining hydraulic pressure in the piston and cylinder arrangement 88. In addition to the end sleeve bearing 78, the transverse support 76 is supported by a plurality of intermediate sleeve bearings 108 that are secured to the outer ends of rearwardly and upwardly inclined support members 110 that are rigidly affixed to the rigid transverse member 94 thus forming a rigid support for the rotatable support member 76.

For controlling operation of the rear support wheels 28 insofar as their elevation is concerned, an elongated tension cable 112 is provided on the forward end thereof and extends around an arcuate member 114 which is attached to the transverse support member 76 in alignment with and in conjunction with the arm 82. The arcuate member 114 is supported by spoke-like elements 116 so that as the rotatable member 76 is rotated, the cable 112 will be wrapped around the periphery thereof for taking up the cable 112 and moving it longitudinally for the purpose of raising and lowering the rear wheels 28 in a manner to be described hereinafter.

The rear wheels 28 are supported by a yoke 118 which is the same as the yoke 38 and is supported by a vertical spindle assembly 120 which is the same as that illustrated in FIGURE 11 for the front wheels 26. The spindle assembly 120 is attached to a transverse support member 122 having depending arms 124 rigid with the outer end thereof. The support member 122 is rotatably supported by sleeve bearings 126 at the rear ends of supporting arms 128 which have the forward ends thereof rigid with a transverse rotatable support member 130 comparable to the support member 76 at the forward end of the frame. The support member 130 is provided with a centrally depending arm 132 to which the rear end of the cable 112 is attached. Thus, when the cable 112 is moved longitudinally, the transverse support member 130 will be rotated.

Figure 12:
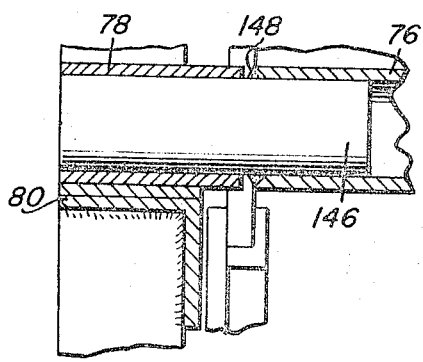
FIGURE 12 is a detailed sectional view taken substantially upon a plane passing along section line 12—12 of FIGURE 1 illustrating the details of construction of the front supporting members.

For maintaining the spindle assemblies 120 and the arms 124 in substantially vertical position during swinging movement of the support member 122, a connecting link 130 is provided which is pivotally connected to the lower end of the arm 124 and pivotally connected to an upwardly extending bracket 136 carried by a transverse support member 138 that has one end thereof rigidly attached to an upstanding bracket 140 and the other end thereof rigidly attached to the upwardly offset portion 36 of the bottom rail 14 as illustrated in FIGURE 8. The ends of the rotatable support member 130 are supported by bearings 142 attached to the top side rails 16 and the bearing sleeves 142 are retained in position by angle iron brackets 144. In each instance of supporting a rotatable cylindrical pipe such as 130 or 76, the end of the pipe as illustrated in FIGURE 12, is provided with a stub axle 146 that is welded to the end of the member 76 as by welding 148 and the stub axle in turn is received in the sleeve bearing such as at 78 with the angle iron brackets 80 being employed to secure the rotatable member 76 to the top side rail 16.

Figure 13:
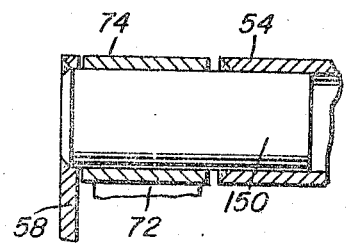
FIGURE 13 is a detailed sectional view taken subtantially upon a plane passing along section line 13—13 of FIGURE 3 illustrating further structural details of the front supporting member.
Figure 14:
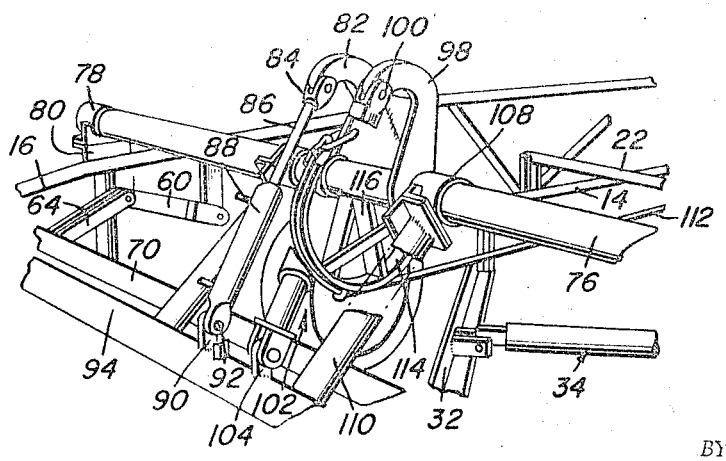
FIGURE 14 is a fragmental perspective view illustrating the structure of the front wheel supporting and elevating mechanism.

FIGURE 13 illustrates the manner of connecting the swingable members 54 and 122 to the arms 58 and the sleeve 74 for the arms 72 which is also by using a stub axle 50 welded into the members 54 which is a tubular pipe.

For controlling the steering movement of the rear wheels 28 in relation to the steering movement of the front wheels 26, the front yoke 38 is provided with a laterally extending and downwardly inclined arm 152 having a cable 154 attached thereto and the cable 164 extends longitudinally along the sides of the frame 12 and is terminally secured to a laterally extending arm 156 carried by the upper end of the rear yoke 118 as illustrated in FIGURE 8. As illustrated, the arm 152 on the forward yoke extends laterally outwardly while the arm 156 on the rear yoke extends laterally inwardly so that when the front wheels 26 pivot in one direction, the rear wheels 28 will be correspondingly pivoted in the other direction so that the rear end of the land leveler will slant in such a manner to form a relatively sharp or square corner.

The bucket assembly 30 is illustrated in more detail in FIGURES 5 and 6 and includes upstanding brackets 158 carried by the lower side rails 14 which supports a rigid transverse support member 160 that is provided with a plurality of rearwardly extending brackets 162 which pivotally supports forwardly extending brackets 164 by virtue of a pivot pin or bolt 166 in each instance. The brackets are interconnected by a transverse tubular member 168 that rigidly interconnects the forward corners of a pair of side plates 170 yet have their rear edges curved and provided with a curved connecting plate 172. Projecting upwardly from the tubular member 168 is a plurality of brackets 174 interconnected by a tubular member 176 paralleling the tubular member 178. The tubular member 176 is also connected to the upper forward corner of the side plates 170 and has a plurality of upstanding brackets 178 rigidly affixed thereto which pivotally receives one end of a telescopic plunger assembly 180 that has the other end thereof pivotally attached to an elongated link 182 that has the lower end thereof pivotally attached to a rearwardly extending bracket 184 carried by a trip blade 186 forming the bottom portion of the bucket assembly and being generally in alignment with the curved wall of plate 172 which terminates above the bottom edge of the side plates 170. The plunger assembly 180 includes a spiral coil spring 188 engaging an abutment 190 on an external tubular member 192. The other end of the spring 188 engages an adustable abutment 194 mounted on an inner member 196 which slides into the outer member 192 thereby varying the tension of the spring 188 against swinging movement of the link 182 which has the center thereof pivotally supported by a pivot link 198 attached pivotally to a bracket 200 secured to a flange 202 on the back of the plate 172 which also pivotally supports the trip blade 186 for movement about a pivot pin 204.

For elevating the bucket assembly, the piston and cylinder assembly 206 is provided which includes a cylinder 208 pivotally attached to a rearwardly extending bracket 210 carried by a transverse support member 212 that is rigidly affixed to an upstanding bracket 214 on each lower side rail 14. A piston rod 216 having a yoke at the upper end thereof designated by 218 is attached to a top plate 220 that is secured in place by a pair of downwardly diverging side straps 222 and a forwardly inclined strap 224 that is anchored to the transverse member 168 as illustrated in FIGURE 5. Thus, by expanding and contracting the piston and cylinder assembly 206, the bucket assembly including the side plates 170, the plate 172, the trip blade 186, the link 182 and the plunger assembly 180 all are pivoted about a pivot axis defined by the pivot bolt 166 interconnecting the brackets 162 and 164.

The supporting plate 220 is also supported by a vertical strap member 226 whch is affixed to the flange 202 and is rigidified therewith by gussets 228. Also gussets are provided for the various upstanding brackets where deemed necessary such as gussets 230 employed in conjunction with upstanding brackets 158.

As illustrated in FIGURES 5 and 6, guide pulleys 232 are provided for the cables 154 so that the cables will pass around the side edges of the bucket assembly and the lift cable may proceed through the supporting mechanism for the bucket assembly such as under one of the inclined support straps 222 alongside of the support strap 226 and the piston rod 216 without interference therefrom.

By using the structure described in the application, the levelers will lift easier with the hydraulic system involved and the wheels will be maintained with the spindle standing up straight at all times when both leveling and when transporting. This reduces the strain on the swivel spindles and eliminates any bending problem and reduces the wear. Further, with the wheels standing up straight at all times, the rear wheels can be made to steer in an opposite direction to the front wheels thus providing four wheel steering whereby the machine can be transported much easier because it will turn with a lesser turning radius and will make a desired turn at a corner. By using this steering mechanism, corners can be negotiated faster thus enabling the leveling operation to be conducted at a faster rate.

It is submitted that in the steering mechanism of the present invention that the tongue structure does not move sideways at all and the same type of tongue used in the previously mentioned patents may be employed. The front wheels will swivel or turn to follow the towing vehicle and when they turn, the back swivel wheels will turn the opposite way thus making the rear of the leveler run opposite from the front end and causing it to turn shorter.

The cables interconnecting the arms attached to the spindles do not cross and extend along the sides of the frame and may be provided with any suitable guide pulleys as deemed necessary. Further, a turnbuckle may be incorporated into each cable for adjusting the effective length thereof for assuring that the front and rear swivel wheels on each side of the leveler will be properly interconnected and adjusted to a proper normal orientation.

The replaceable sleeve in each of the spindles enables this sleeve to be easily removed and replaced for saving the spindles from wear.

The bucket assembly forms a part of the leveler in that the blade or plate running across the leveler is in effect a pusher blade which enables the bucket to push the dirt along in front of it a longer distance than the angle type blade before losing its dirt. This is better for moving a mound into a low place especially if the low place is very far away. The leveler may be provided with stationary blades on the lower edge or may be provided with a pair of trip blades as illustrated so that in the event a stump or other obstruction is engaged, the trip blade on that particular side of the bucket which engages the stump will trip and enable the leveler to pass over the obstruction which does not leave an excessive mound of dirt such as would occur if the entire leveler bucket was elevated. The bottom blade or lip just leans back far enough to slide over the obstruction and pitch back into the ground thus losing none or very little dirt.

By orientating the bucket centrally of the leveler, the rear blades spread and pack any dirt the bucket leaves in holes. When soil is too wet and trashy for the bucket to work properly, the bucket may be elevated completely out of the way thus leaving the leveler to be used with the angle blades. When the soil is right for using the bucket, it can be dropped down and carries dirt in it and the other blades also are used at the same time. In this way you carry a surplus of dirt to fill deeper holes than the other blades would fill up. When using the bucket and blades at the same time or when using only the bucket, the bucket can be dropped down below the other blades and used as a bucket leveler only. It will be used in this position mostly when moving dirt quite a distance to a hole or wash-out and for precision leveling thus combining two types of leveling in one leveler in which the two types may be used simultaneously or either type of leveling may be employed selectively. A lock-out mechanism may be provided for the central bucket if desired so that the bucket can be elevated as by setting a lock pin such as that employed in conjunction with the front pivotal support member 76 can be incorporated for locking the hydraulic bucket in elevated position.

For maintaining the wheels in proper orientation, a drag link 234 pivotally interconnects forwardly extending arms 236 on the rear supporting yokes 118 so that the two rear wheels 28 will swivel together. Also, the two front wheels 26 swivel together by using a drag link 238 pivotally connected to rearwardly extending arms 240 on cap 56 by pivot bolts 242. An extra lock bolt 244 may be used to lock the wheels, both front and rear, when the device is being backed so that it will back in a straight line.

Figure 15:
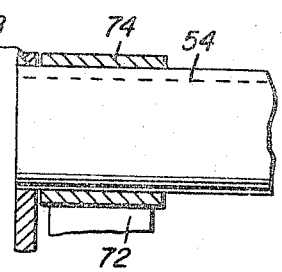
FIGURE 15 is a sectional view similar to FIGURE 13 illustrating another bearing structure.

FIGURE 15 illustrates a simplified structure in which the pipe 54 actually goes through and journals sleeve 74 thereon thereby eliminating stub axle 150 as employed in FIGURE 13. This arrangement can also be employed in FIGURE 12 where member 76 would go straight through sleeve 78 thus eliminating stub axle 146. This type of structure is somewhat simplified and less expensive to manufacture.

The number and arrangement of the blades may be varied to provide a desired movement of the soil when leveling. Also, other arrangements may be provided for supporting the wheels and changing the elevation thereof while maintaining vertical orientation of the pivot axis for all of the wheels for enabling easy steering of the front wheels and the rear wheels and retaining a positive relationship therebetween.

Various gussets, reinforcements, bracings and the like are employed wherever desired for rigidity and for retaining the strength of the device to the desired level for rigidity.

The trip blade arrangement each includes a stationary upper part and a pivotal lower edge which is retained in place by the spring biased plunger assembly 34 which will enable the lower edge to trip rearwardly when engaging a stump or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A land leveler comprising an elongated rigid frame, a plurality of elongated blades mounted on said frame, the longitudinal axes of the blades being in rearwardly inclined relation to the longitudinal axis of the frame, a transversely extending bucket pivotally mounted on said frame for pivotal movement about a transverse axis, said bucket being disposed intermediate the blades with at least one inclined blade disposed forwardly and rearwardly of the bucket, said bucket adapted for selective engagement with the ground surface for moving earth into low spots, said bucket including a trip blade mounted on the lower edge thereof, and spring means engaging the trip blade for retaining it in substantially vertical position but enabling it to pivot rearwardly at the bottom edge thereof so that the bucket may pass over an obstruction without the bucket being elevated, said spring means including an elongated link pivotally attached to the rear of the bucket and having a lower end pivotally attached to the trip blade, the upper end of said link being pivotally attached to a spring plunger assembly having one end thereof pivotally attached to the frame thus biasing the trip blade to its operative vertical position.

2. The structure as defined in claim 1 wherein said spring plunger assembly includes a pair of telescopic plunger members telescoping into each other, a spring between the telescopic members for urging them apart, said telescopic plunger assembly extending forwardly above the bucket and attached to the forward end portion thereof for movement therewith.

3. The structure as defined in claim 2 together with supporting wheels adjacent each end of said frame, means interconnecting the forward supporting wheels and the frame for changing the elevational position of the front supporting wheels in relation to the frame, and means interconnecting the front supporting wheels and the rear supporting wheels for varying the elevational relationship of the rear supporting wheels at the same time as the elevational relationship of the front supporting wheels and the frame is changed.

4. The structure as defined in claim 3 wherein each of said front supporting wheels is in the form of a swivel wheel having an upstanding mounting spindle, a transverse axle interconnecting said spindles, supporting means swivelly supporting said spindles from said axle, means for swinging the axle in an arcuate path about a transverse axis spaced therefrom, and means for retaining the spindles in vertical position during swinging movement of the axle for maintaining the spindles in vertical position during transport and leveling operations, said means supporting the front axle for swinging movement including a pivotal support member supported for pivotal movement about a transverse axis.

5. The structure as defined in claim 4 wherein said means for supporting the rear wheels includes a transverse axle, vertical supporting spindles for the rear wheels swivelly supported by said axle, parallelogram linkage means connected to said axle for maintaining the rear wheel spindles in constant angular relationship to the frame during swinging movement of the rear axle, said means interconnecting the front and rear wheels including a tension cable, an offset arm on the rear axle having the tension cable attached thereto, and an arcuate member attached to the front axle supporting member, said cable having one end attached to said arcuate member whereby swinging movement of the front axle will wind the tension cable on the peripheral surface of the arcuate member thereby causing swinging movement of the rear axle.

6. The structure as defined in claim 5 wherein each of the front wheels includes a laterally outwardly extending offset arm attached thereto, each of the rear wheels having a laterally inwardly extending offset arm attached thereto, and cables interconnecting the outwardly and inwardly extending arms respectively on each side of the frame whereby swivel movement of the front wheels in one direction will cause swivel movement of the rear wheels in an opposite direction for turning the frame in a shorter radius.

7. The structure as defined in claim 6 wherein each of said spindles includes an offset steering arm, a drag link interconnecting each pair of laterally extending steering arms for retaining the associated wheels in parallel relation.

8. The structure as defined in claim 7 wherein said pivotal support member for the front axle includes a pair of offset arms rigid therewith, a hydraulic piston and cylinder assembly interconnecting one of said offset arms and the frame and forming the means for changing the elevational position of the front wheels, and a telescopic locking device interconnecting the other of the offset arms and the frame for locking the front axle support member in adjusted position about said transverse axis of pivotal movement.

9. In a land leveling device comprising an elongated frame and a blade means mounted thereon for engagement with a ground surface, a pair of rear steerable wheels carried by said frame, a pair of forward free-swivelling wheels carried by the forward portion of said frame with the swivelling wheels being independent of any connection with a towing implement so that when lateral thrust is exerted on the forward portion of the frame, the swivel wheels will pivot about generally vertical axes to permit the forward end of the frame to follow the thrust force, an offset steering arm rigid with each of the front wheels and extending laterally in one direction from the vertical axes of pivotal movement thereof, an offset steering arm mounted from each of the rear steerable wheels and extending laterally therefrom in an opposite direction to the steering arms on the front wheels, and connecting members interconnecting the front and rear offset arms for pivoting the rear steerable wheels in response to pivotal movement of the front swivel wheels in an opposite direction thereto whereby the steering control of the rear wheels is responsive to the freely swivelling front wheels and independent of any pivotal movement of a drafting implement or tongue attached to the front end.

References Cited

UNITED STATES PATENTS

| | | | |
|---|---|---|---|
| 1,210,901 | 1/1917 | Carraway | 172—266 |
| 1,383,409 | 7/1921 | Liddell | 37—42 X |
| 1,450,195 | 4/1923 | Winters | 37—117.5 X |
| 1,864,042 | 6/1932 | Fisher. | |
| 2,624,133 | 1/1953 | Smeed | 37—150 |
| 2,659,166 | 11/1953 | Mathias. | |
| 2,843,948 | 7/1958 | Lindeman et al. | 37—178 |
| 2,994,143 | 8/1961 | Kenney. | |
| 3,052,998 | 9/1962 | Childers | 37—150 |
| 3,061,020 | 10/1962 | Mannhein | 172—417 X |
| 3,063,178 | 11/1962 | Purdy | 37—152 |
| 3,081,567 | 3/1963 | Saul. | |
| 3,141,250 | 7/1964 | Eddins | 37—180 |
| 3,172,218 | 3/1965 | Constantin | 37—153 |

FOREIGN PATENTS

| | | |
|---|---|---|
| 653,231 | 12/1962 | Canada. |
| 313,333 | 5/1956 | Switzerland. |

ABRAHAM G. STONE, *Primary Examiner.*

JOE O. BOLT, JR., WILLIAM A. SMITH III, *Examiners.*

R. L. HOLLISTER, *Assistant Examiner.*